(12) United States Patent
Hildinger et al.

(10) Patent No.: US 10,944,089 B2
(45) Date of Patent: Mar. 9, 2021

(54) ELECTRICAL ENERGY-STORAGE UNIT WITH STORAGE MODULES OF DIFFERENT TYPES

(71) Applicant: Bayerische Motoren Werke Aktiengesellschaft, Munich (DE)

(72) Inventors: Juergen Hildinger, Hoehenkirchen-Siegertsbrunn (DE); Sina Block, Munich (DE); Frank Moebius, Munich (DE); Stefan Juraschek, Neubiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 149 days.

(21) Appl. No.: 15/840,149

(22) Filed: Dec. 13, 2017

(65) Prior Publication Data

US 2018/0102527 A1    Apr. 12, 2018

Related U.S. Application Data

(63) Continuation of application No. PCT/EP2016/065978, filed on Jul. 6, 2016.

(30) Foreign Application Priority Data

Aug. 25, 2015  (DE) .................... 10 2015 216 181.1

(51) Int. Cl.
*H01M 2/20* (2006.01)
*H01M 16/00* (2006.01)
*H01M 2/10* (2006.01)

(52) U.S. Cl.
CPC ......... *H01M 2/206* (2013.01); *H01M 2/1077* (2013.01); *H01M 16/00* (2013.01); *H01M 2220/20* (2013.01)

(58) Field of Classification Search
CPC .................................................... H01M 16/00
See application file for complete search history.

(56) References Cited

U.S. PATENT DOCUMENTS

| 4,863,812 A | 9/1989 | Ueda et al. | |
|---|---|---|---|
| 2004/0201365 A1* | 10/2004 | Dasgupta ................ | B60L 58/20 320/116 |

(Continued)

FOREIGN PATENT DOCUMENTS

| CN | 102195100 A | 9/2011 |
|---|---|---|
| DE | 37 90 276 C2 | 7/1996 |

(Continued)

OTHER PUBLICATIONS

International Search Report (PCT/ISA/210) issued in PCT Application No. PCT/EP2016/065978 dated Aug. 30, 2016 with English translation (Four (4) pages).

(Continued)

*Primary Examiner* — Jonathan Crepeau
(74) *Attorney, Agent, or Firm* — Crowell & Moring LLP

(57) ABSTRACT

An electrical energy-storage unit has a plurality of electrically coupled and interchangeable storage modules each with a multiplicity of storage cells connected in series or in parallel. The energy-storage unit has storage modules of a first type, which have a certain energy density. The energy-storage unit has storage modules of a second type which have a higher energy density than the storage modules of the first type. At least two storage modules of the second type fit into the spatial volume of a storage module of the first type.

14 Claims, 2 Drawing Sheets

(56) References Cited

U.S. PATENT DOCUMENTS

| | | | |
|---|---|---|---|
| 2007/0029124 A1* | 2/2007 | DasGupta | B60L 58/21 |
| | | | 429/218.1 |
| 2011/0223468 A1 | 9/2011 | Ferber, Jr. | |
| 2014/0272501 A1 | 9/2014 | O'Brien et al. | |
| 2015/0232049 A1 | 8/2015 | Ohsumi et al. | |

FOREIGN PATENT DOCUMENTS

| | | |
|---|---|---|
| DE | 10 2013 114 892 A1 | 7/2015 |
| WO | WO 2011/115777 A1 | 9/2011 |

OTHER PUBLICATIONS

German-language Written Opinion Report (PCT/ISA/237) issued in PCT Application No. PCT/EP2016/065978 dated Aug. 30, 2016 (Seven (7) pages).
German-language Office Action issued in counterpart German Application No. 10 2015 216 181.1 dated Jun. 8, 2016 (Four (4) pages).
Chinese Office Action issued in Chinese application No. 201680026163.4 dated Mar. 26, 2020 (Five (5) Pages).

\* cited by examiner

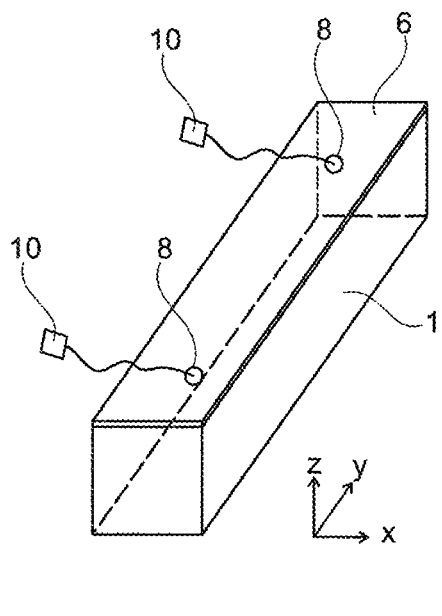
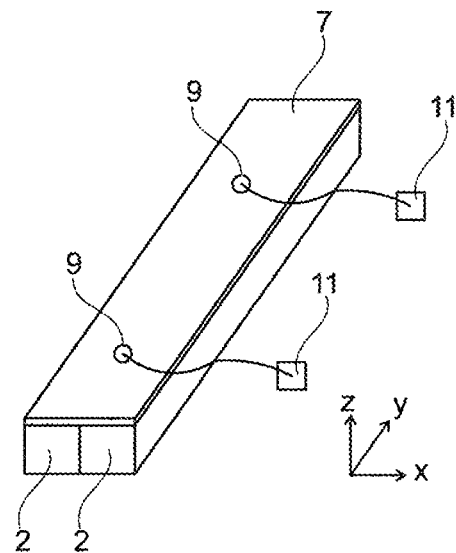
Fig. 3A   Fig. 3B
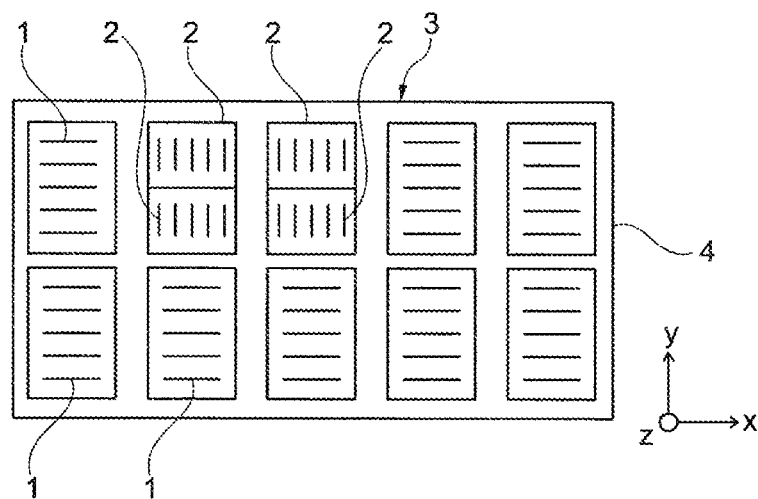
Fig. 4

ELECTRICAL ENERGY-STORAGE UNIT WITH STORAGE MODULES OF DIFFERENT TYPES

CROSS REFERENCE TO RELATED APPLICATIONS

This application is a continuation of PCT International Application No. PCT/EP2016/065978, filed Jul. 6, 2016, which claims priority under 35 U.S.C. § 119 from German Patent Application No. 10 2015 216 181.1, filed Aug. 25, 2015, the entire disclosures of which are herein expressly incorporated by reference.

BACKGROUND AND SUMMARY OF THE INVENTION

The invention relates to an electrical energy store, in particular for motor vehicles, having a plurality of electrically coupled and exchangeable storage modules, which each have a multiplicity of storage cells connected in series or in parallel.

The development of electrical energy stores for motor vehicles, in particular hybrid and electric vehicles, is advancing rapidly, with the result that it is possible to achieve increasingly higher capacities.

Electric and hybrid vehicles generally have energy stores (also called storage units) that have been designed for a specific vehicle series. A vehicle series is produced for a specific period of time. Due to the progress in the development of energy stores, it is highly probable that a subsequent vehicle series is already designed with a further-developed energy store. However, on account of legal regulations, replacement parts have to be provided for the earlier vehicle series for a number of years. This requires storage modules for the earlier energy store to have to be provided as replacements for obsolete storage modules for years, even though the earlier energy store is no longer used in newer vehicle series. However, only a small number of units are required as replacement parts now, wherein the manufacturing costs are high on account of the low number of units. Producing the storage modules in advance is likewise problematic, since stored and unused storage modules also age.

It is therefore an object of the present invention to at least partially solve the problems described above. This and other objects are achieved by an energy store, as well as by a vehicle equipped with such an energy store, in accordance with embodiments of the invention.

In accordance with one exemplary embodiment of the present invention, an electrical energy store is provided having a plurality of electrically coupled, in particular electrically series-connected or parallel-connected, and exchangeable storage modules, which each have a multiplicity of storage cells connected in series or in parallel, wherein the energy store has storage modules of a first type that have a specific energy density, wherein the energy store has storage modules of a second type that have a higher energy density than the storage modules of the first type, and wherein at least two storage modules of the second type fit into the spatial volume of one storage module of the first type. This exemplary embodiment provides an opportunity to combine storage modules of a first type, for example of a previous generation, with storage modules of a second type, for example of a subsequent generation. In this case, for example, two storage modules of the second type can replace one storage module of the first type. By coordinating the dimensions of the first and second type in this way, no adjustments to the rest of the energy store are necessary, but rather only one storage module is exchanged for two new ones with a higher energy density.

In accordance with a further exemplary embodiment of the invention, the storage modules of the first type have larger outer surfaces than the storage modules of the second type. That is to say that an entire outer surface of a storage module of the first type is larger than an entire outer surface of a storage module of the second type.

In accordance with a further exemplary embodiment of the invention, the storage modules of the first type have a greater weight than the storage modules of the second type.

In accordance with a further exemplary embodiment of the invention, a base area of two storage modules of the second type arranged next to one another is substantially the same size as a base area of one storage module of the first type.

In accordance with a further exemplary embodiment of the invention, a length of the storage modules of the first type is substantially twice as long as a length of the storage modules of the second type.

In accordance with a further exemplary embodiment of the invention, a length of the storage modules of the first type is substantially equal to the length of the storage modules of the second type.

In accordance with a further exemplary embodiment of the invention, a width of the storage modules of the first type is substantially equal to the length of the storage modules of the second type.

In accordance with a further exemplary embodiment of the invention, the energy store further has a covering plate for electrically connecting the storage cells of the storage module of the first type and a covering plate for electrically connecting the storage cells of the storage module of the second type, wherein all the covering plates have identical electrical connections for electrically coupling the storage modules to one another.

In accordance with a further exemplary embodiment of the invention, two storage modules of the second type together have substantially the same electrical capacity as storage modules of the first type.

The invention furthermore relates to a motor vehicle having an energy store of this kind.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3A schematically shows a storage module of a first type.

FIG. 3B schematically shows a storage module of a second type.

FIG. 4 shows a modification of the energy store according to an embodiment of the invention.

DETAILED DESCRIPTION OF THE DRAWINGS

Figure 1:
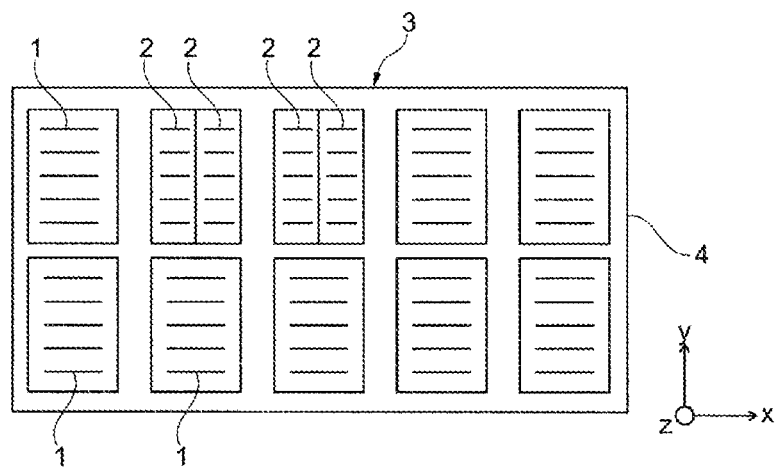
FIG. 1 schematically shows an electrical energy store in accordance with an exemplary embodiment of the invention.

FIG. 1 schematically shows an electrical energy store 3 (also called a storage unit) in accordance with an exemplary embodiment of the invention. The energy store 3 is used in electric and hybrid vehicles to store electrical energy. The energy store 3 is constructed from a multiplicity of storage modules 1 and 2, which comprise storage modules 1 of a first type and storage modules 2 of a second type. All the storage modules 1, 2 are electrically connected in series or in parallel. The storage modules 1, 2 are arranged in a support structure 4, such as a housing, for example, which is arranged on the underbody of the motor vehicle, for example.

Provided in the support structure 4 are storage module mounting regions, which are all dimensioned in such a way that a storage module 1 of the first type fits into them. Each of the storage module mounting regions is dimensioned in such a way that at least the base areas thereof correspond in each case to a base area of a storage module 1 of the first type. The storage modules 1, 2 can be oriented in such a way that a longitudinal direction of the storage modules 1, 2 runs in a transverse direction y of the vehicle, a width direction of the storage modules 1, 2 runs in a longitudinal direction x of the vehicle and a vertical direction of the storage modules 1, 2 runs in the direction of a vertical axis z of the vehicle. The longitudinal direction of the storage modules 1, 2 in this case extends along the longer side of the storage modules. This is preferably a stacking direction of the storage cells shown in FIG. 2. The orientation of the storage modules 1, 2 is of, course, only exemplary and other orientations are also possible.

Figure 2:
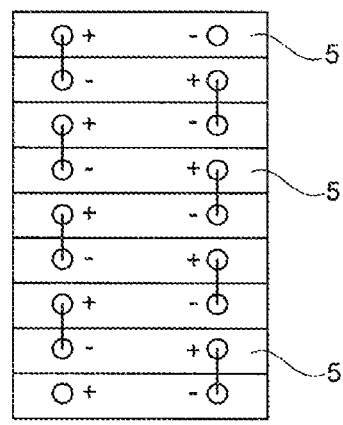
FIG. 2 shows the general known construction of a storage module.

FIG. 2 shows the general known construction of a storage module. A storage module is constructed from a multiplicity of storage cells 5, that is to say accumulators, which are electrically connected to one another in series and together form a storage module. A parallel connection of the storage cells 5 is likewise possible. A storage module thus forms a block of storage cells 5. The individual storage cells 5 are arranged next to one another in such a way that the longitudinal directions of the storage cells 5 run transversely to the longitudinal direction of the storage module that is formed by the storage cells. The individual storage cells are electrically connected to one another by way of covering plates, which are provided with the reference numerals 6 and 7 in FIGS. 3A and 3B. Said covering plates connect the individual storage cells in the form of a series circuit on the side facing toward the storage cells and have electrical contact points 8, 9 on the opposite side.

FIGS. 3A and 3B schematically show the storage modules 1 of the first type (FIG. 3A) and the storage modules 2 of the second type (FIG. 3B) in more detail. The storage modules 1 and 2 are cuboidal, wherein the storage modules 1 of the first type and of the second type are, for example, the same length (that is to say in the direction of their longer side). The storage modules 2 of the second type can be, for example, half as wide as the storage modules 1 of the first type, with the result that two storage modules 2 of the second type placed next to one another form the same overall base area as the base area of one storage module 1 of the first type. Other variants are possible and are described below. The height of the storage modules 2 of the second type corresponds, for example, to two thirds or half of the height of the storage modules 1 of the first type. It is essential that the dimensions and orientations are selected in such a way that two storage modules 2 of the second type arranged next to one another fit into the storage module mounting regions of the support structure 4. In other words, one storage module 1 of the first type can be replaced by two storage modules 2 of the second type. In the case of half of the height, it would even be possible to replace one storage module 1 of the first type with four storage modules of the second type, with the result that said four storage modules occupy the same spatial volume of the storage module 1 of the first type. The four storage modules of the second type would then have to be arranged in such a way that in each case two storage modules arranged next to one another are positioned above one another in a congruent manner. The covering plate 6 electrically connects the individual storage cells 5 of the storage module 1 of the first type to one another, preferably in a series circuit. The covering plate 7 covers all storage modules 2 of the second type arranged in a storage module mounting region and electrically connects them to one another, preferably in a parallel circuit, with the result that the storage modules of the second type have the same voltage level as the storage modules of the first type. In addition, the covering plate 7 could also have the function of electrically connecting the individual storage cells 5 of said storage modules to one another, preferably in the form of a series circuit. As an alternative, said series circuit is realized by means of a separate covering plate.

Furthermore, the storage modules 2 of the second type are lighter than the storage modules 1 of the first type, that is to say that they have a lower weight. A capacity of the storage modules of the second type is substantially half the capacity of the storage modules of the first type. The storage modules 2 of the second type also have a higher energy density than the storage modules 1 of the first type.

Electrical connections are provided in the storage modules 1, 2 for electrically connecting the storage modules 1, 2 in the form of a parallel or series circuit of all storage modules of the energy store 3. In the storage modules 1 of the first type, the electrical connections comprise the electrical contact points 8 and/or connection elements 10 connected to the electrical contact points 8, said connection elements 10 being formed, in particular, by cables provided with plugs or sockets. Accordingly, in the storage modules 2 of the second type, the electrical connections comprise the electrical contact points 9 and/or connection elements 11 connected to the electrical contact points 9, said connection elements 11 being formed, in particular, by cables provided with plugs or sockets. In accordance with the invention, the electrical connections of the storage modules of the first and second type are compatible, in particular identical.

FIG. 4 shows a modification of the electrical energy store 3 described above. The above description also applies to this exemplary embodiment, which differs only in that the storage modules 1, 2 are oriented in such a way that a longitudinal direction of the storage modules 1, 2 runs in a longitudinal direction x of the vehicle, a width direction of the storage modules 1, 2 runs in a transverse direction y of the vehicle and a vertical direction of the storage modules 1, 2 runs in the direction of a vertical axis z of the vehicle. In FIG. 4, a length of the storage modules 1 of the first type corresponds to twice the width of the storage modules 2 of the second type. A width of the storage modules 1 of the first type corresponds to the length of the storage modules 2 of the second type.

An orientation in which a longitudinal direction of the storage modules 1, 2 runs in a transverse direction y of the vehicle, a width direction of the storage modules 1, 2 runs in a longitudinal direction x of the vehicle and a vertical direction of the storage modules 1, 2 runs in a direction of a vertical axis z of the vehicle is likewise possible, wherein a length of the storage modules 1 of the first type corresponds to twice the length of the storage modules 2 of the second type and a width of the storage modules 1 of the first type corresponds to the width of the storage modules 2 of the second type. In this case, two storage modules 2 of the second type would be arranged next to one another in the y direction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical energy store for an electric or hybrid vehicle, comprising:
    a plurality of electrically coupled and exchangeable storage modules that power propulsion of the vehicle, wherein each storage module has a plurality of storage cells connected in series or in parallel, and wherein the plurality of storage modules includes:
        a first type of storage module having a first base area and a first height, and
        a plurality of a second type of storage module, each having a second base area and a second height, and a higher energy density than the first type of storage module; and
    a support structure with a plurality of mounting regions provided in the support structure, each mounting region defining a volume via which the first type of storage module and the plurality of second type of storage modules fit into the support structure,
    wherein the volume defines a base area substantially corresponding to the first base area and to the plurality of second base areas, and a height substantially corresponding to the first height and to the plurality of second heights.

2. The energy store as claimed in claim 1, wherein the storage modules of the first type have larger outer surfaces than the storage modules of the second type.

3. The energy store as claimed in claim 2, wherein the storage modules of the first type have a greater weight than the storage modules of the second type.

4. The energy store as claimed in claim 1, wherein the storage modules of the first type have a greater weight than the storage modules of the second type.

5. The energy store as claimed in claim 3, wherein two of the second base areas arranged next to one another is substantially the same size as the first base area.

6. The energy store as claimed in claim 1, wherein two of the second base areas arranged next to one another is substantially the same size as the first base area.

7. The energy store as claimed in claim 5, wherein a length of the storage modules of the first type is substantially twice as long as a length of the storage modules of the second type.

8. The energy store as claimed in claim 1, wherein a length of the storage modules of the first type is substantially twice as long as a length of the storage modules of the second type.

9. The energy store as claimed in claim 5, wherein a length of the storage modules of the first type is substantially equal to the length of the storage modules of the second type.

10. The energy store as claimed in claim 1, wherein a length of the storage modules of the first type is substantially equal to the length of the storage modules of the second type.

11. The energy store as claimed in claim 5, wherein a width of the storage modules of the first type is substantially equal to the length of the storage modules of the second type.

12. The energy store as claimed in claim 1, wherein a width of the storage modules of the first type is substantially equal to the length of the storage modules of the second type.

13. The energy store as claimed in claim 1, further comprising:
    a first covering plate for electrically connecting the storage cells of the storage module of the first type; and
    a second covering plate for electrically connecting the storage cells of the storage module of the second type,
    wherein the first and second covering plates have identical electrical connections for electrically coupling the storage modules to one another.

14. The energy store as claimed in claim 1, wherein two storage modules of the second type together have substantially the same electrical capacity as one storage module of the first type.

* * * * *